US012202407B2

(12) United States Patent
Van Wiemeersch et al.

(10) Patent No.: US 12,202,407 B2
(45) Date of Patent: Jan. 21, 2025

(54) UNKNOWN CARGO DETECTION AND EVIDENCE COLLECTION SYSTEM FOR A VEHICLE, AND ASSOCIATED METHOD

(71) Applicant: Ford Global Technologies, LLC, Dearborn, MI (US)

(72) Inventors: John Robert Van Wiemeersch, Novi, MI (US); Brendan Diamond, Grosse Pointe, MI (US); Stuart C. Salter, White Lake, MI (US); Pietro Buttolo, Dearborn Heights, MI (US); Keith Weston, Canton, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 18/186,028

(22) Filed: Mar. 17, 2023

(65) Prior Publication Data
US 2024/0308426 A1 Sep. 19, 2024

(51) Int. Cl.
*G08B 21/22* (2006.01)
*B60Q 9/00* (2006.01)
(Continued)

(52) U.S. Cl.
CPC .............. *B60Q 9/00* (2013.01); *B60R 25/33* (2013.01); *G07C 5/008* (2013.01)

(58) Field of Classification Search
CPC ......... B60W 2530/10; B60W 2556/45; B60W 2556/50; B60W 60/001; B60W 10/04; B60W 10/10; B60W 10/18; B60W 10/20; B60W 2030/082; B60W 2300/14; B60W 2300/145; B60W 2420/403; B60W 2420/408; B60W 2420/54; B60W 2510/18; B60W 2520/10; B60W 2520/30; B60W 2530/201; B60W 2552/00; B60W 2552/05; B60W 2552/15; B60W 2552/30; B60W 2552/40; B60W 2552/50; B60W 2552/53;
(Continued)

(56) References Cited

U.S. PATENT DOCUMENTS 7,421,334 B2 9/2008 Dahlgren et al.
11,097,659 B1 * 8/2021 Abdelhamid .......... B60Q 5/005
(Continued)

FOREIGN PATENT DOCUMENTS

CN 2782471 Y 5/2006

OTHER PUBLICATIONS

Alexa Mae Asperin, Official: Smugglers Taped Drugs to Bottom of Woman's Car Using Her as 'Blind' Drug Mule, Jul. 20, 2022, 1-3.
(Continued)

*Primary Examiner* — Dionne Pendleton
(74) *Attorney, Agent, or Firm* — Frank Lollo; Eversheds Sutherland (US) LLP

(57) ABSTRACT

An event detection system is for a vehicle. The system includes a processor, a sensor suite electrically connected to the processor, and a memory. The memory has instructions that, when executed by the processor, cause the processor to perform the operations including receive an ON command, and receive data from the sensor suite. The data is indicative of the event, and the event includes the planting of unknown cargo on the vehicle.

14 Claims, 6 Drawing Sheets

(51) Int. Cl.
  *B60R 25/33* (2013.01)
  *G07C 5/00* (2006.01)
  *G08B 23/00* (2006.01)
(58) Field of Classification Search
  CPC ....... B60W 2554/20; B60W 2554/402; B60W 2554/4041; B60W 2554/4046; B60W 2554/80; B60W 2554/802; B60W 2555/20; B60W 2555/60; B60W 2556/40; B60W 2710/18; B60W 2710/20; B60W 2720/10; B60W 2720/125; B60W 2756/10; B60W 30/09; B60W 30/0956; B60W 30/12; B60W 30/143; B60W 30/146; B60W 30/17; B60W 30/18154; B60W 30/18159; B60W 30/18163; B60W 40/02; B60W 40/04; B60W 40/06; B60W 40/068; B60W 40/076; B60W 40/105; B60W 50/0205; B60W 50/0225; B60W 50/14; B60W 60/0011; B60W 60/0015; B60W 60/0016; B60W 60/0017; B60W 60/00182; B60W 60/00184; B60W 60/00274; B60Q 1/46; B60Q 5/005; B60R 25/102; B60R 25/305; B60Y 2200/147; G01C 21/3415; G01C 21/3469; G01C 21/3815; G01C 21/3848; G01C 21/3885; G01C 21/3889; G01G 19/12; G01G 23/002; G01G 23/01; G06Q 10/083; G06Q 10/087; G06V 20/582; G06V 20/588; G08B 13/08; G08B 13/1472; G07C 5/008
  See application file for complete search history.

(56) References Cited

U.S. PATENT DOCUMENTS

| | | | | |
|---|---|---|---|---|
| 2003/0222789 | A1* | 12/2003 | Polyakov | G06T 7/0002 340/425.5 |
| 2007/0153974 | A1* | 7/2007 | Smith | G01V 5/20 378/57 |
| 2017/0241066 | A1* | 8/2017 | Caspers | G08B 21/24 |
| 2018/0334137 | A1* | 11/2018 | Salter | B60R 25/33 |
| 2019/0027028 | A1* | 1/2019 | Fields | G08G 1/166 |
| 2020/0089219 | A1* | 3/2020 | Kaspersky | H04L 12/403 |
| 2021/0188213 | A1* | 6/2021 | Stabel | B60R 25/305 |
| 2023/0014528 | A1* | 1/2023 | Grohman | G01G 23/01 |

OTHER PUBLICATIONS

Narcotics and Contraband Detection, MS Tech, Sep. 10, 2020, 1-2.
Leandra Bernstein, Vehicle Scanning Technology at the Border is About to Ruin the Drug Trade, KECI, Aug. 30, 2019, 1-10.
U.S. Customs and Border Protection, Border Patrol Overview, Aug. 24, 2021, 1-6.

* cited by examiner

UNKNOWN CARGO DETECTION AND EVIDENCE COLLECTION SYSTEM FOR A VEHICLE, AND ASSOCIATED METHOD

BACKGROUND

In recent years, the United States of America has maintained over 100 official vehicle crossing stations along its borders. These are in 16 states covering 75 counties. For the most part, the crossings are evenly distributed along the border, and both the Canadian and Mexican borders have the highest distribution of residents living within 100 miles of their borders. Many of these residents also commute routinely over the border for daily employment, periodic business trips, vacation purposes, or other purposes which may be known to others.

Individuals with predictable routines, or plans that have become known to others, can become victims of Drug Trafficking Organizations (DTOs), who place drugs and/or a tracker device on or in their vehicle without the owner being aware of the act. These victims are known as "blind mules." If the blind mule makes it across the border without the drugs being detected by authorities, the DTOs then use the tracker device to go retrieve the contraband. Further yet, if the blind mule is caught, the DTOs lose the drugs and no one from their organization is arrested. For this reason, DTOs ship smaller quantities of contraband with blind mules.

Of course, the innocent blind mule may be arrested, and due to incarceration, and the process of defending themselves, may lose their job, their vehicle, and a considerable amount of money despite being found innocent. There have been several dozen high profile cases of blind mules that were victimized and eventually found innocent. However, most of these cases involve prolonged incarceration, hiring an attorney, and considerable investigation to collect facts to help prove their innocence.

Further complicating matters, the truly guilty DTO smugglers are now also claiming to be blind mules when they are caught. As such, many border city prosecutors are now being accused of starting to assume everyone is guilty until proven innocent or are requiring a much higher burden of proof.

It is with respect to these and other considerations that the instant disclosure is concerned.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
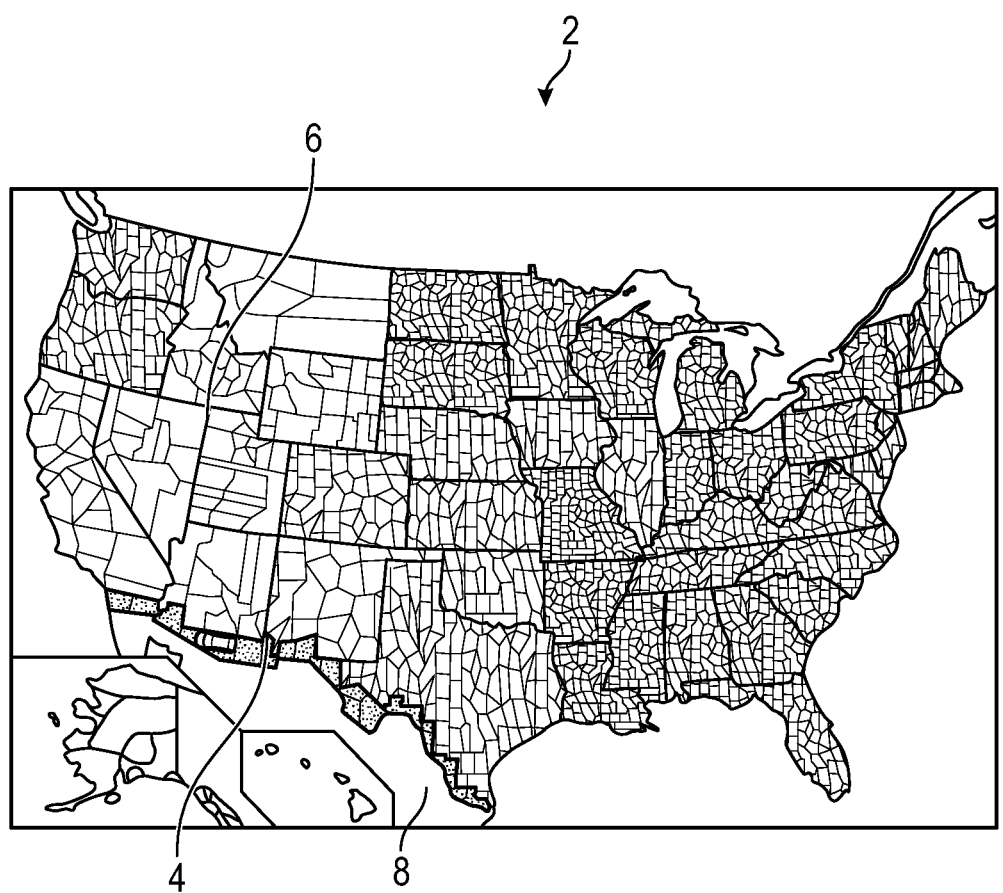
FIG. 1 is a map of the United States, with a border region between the United States and Mexico highlighted.

The systems, apparatuses, and methods disclosed herein assist at least in part in minimizing the likelihood of blind drug mule victimization and also increasing the likelihood that DTO members will be apprehended/prosecuted. In one example, a system is provided for a vehicle. The system includes a processor, a sensor suite (which comprises a single sensor or multiple sensors) electrically connected to the processor, and a memory. The system may be an event detection system wherein the processor receives an ON command and then receives data from the sensor suite. The data may be indicative of the event and may include the loading or planting of unknown cargo on the vehicle by a third party, as well as a location or approximate location on the vehicle where the unknown cargo was planted (e.g., in a wheel well, under a bumper, etc.). In another example, the system is an evidence collection system, and the processor receives an ON command and then collects evidence with the sensor suite responsive to receiving the ON command.

The event detection system is configured to passively and/or actively monitor the vehicle. For example, the system may passively monitor the vehicle by employing the sensor suite to check a weight of the vehicle, a fuel level of the vehicle, a wheel position of the vehicle, and the like. The sensor suite may monitor all these aspects of the vehicle both at key-on and key-off states. That is, the sensor suite may monitor these aspects when the vehicle is on, when the driver turns the vehicle off, and when the driver returns to the vehicle. Unique patterns corresponding to changes in these parameters, as measured by the sensor suite, may allow the processor to determine that a blind drug mule event has occurred. For example, if the sensor suite determines that the air pressure of one of the wheels has changed (e.g., responsive to a DTO member attaching tracker devices, unknown or unwanted cargo such as illegal drugs, and the like, thereto) in a manner consistent with a blind drug mule event, the processor can alert the owner of the vehicle. This may occur in any number of different ways. For example, the processor may instantly send a wireless alert notification to a mobile device of the driver, may send an alert to a database and/or to authorities, and/or may send an alert to a human to machine interface of the vehicle when the driver returns to the vehicle and turns on the car.

Additionally, the system may also actively monitor for blind drug mule events. For example, the sensor suite of the system may scan for the presence of a mobile device not associated with (e.g., not paired with) the vehicle. Such a mobile device might be one belonging to a DTO member. The system is also configured to create a Macro Capacitive Sensor (MCS) bumper around the vehicle to detect anyone breaching a perimeter of the vehicle.

Furthermore, as stated above, the system may also be in the form of an evidence collection system, one where the sensor suite includes a camera, a piezoelectric microphone, and a GPS system. Both when the vehicle is in an OFF state and when the vehicle is in an ON state, the camera may take footage of the vehicle's surroundings (e.g., to record the DTO member placing drugs on the vehicle), the piezoelectric microphone may record any potential vehicle tampering sounds (e.g., illegal drugs being placed on a wheel of the vehicle), and the GPS system may record a GPS location of the vehicle as well as a GPS location of any surrounding businesses. This might be useful to apprehend the DTO member responsible, and others in the DTO, for placing the unknown cargo, that is, third party cargo, on the vehicle. More specifically, once the GPS system determines that there were surrounding businesses near the location where a blind drug mule event occurred (e.g., the placing of third party cargo on the vehicle, which is also referred herein as planting or loading of unknown cargo), that data, and any data from the camera and the piezoelectric microphone, can be stored in an evidence database via a cloud. Accordingly, once the database is searched, and it is revealed that businesses were nearby, potential surveillance footage from the businesses could be subpoenaed, leading to both exoneration of the blind drug mule victim and arrest/prosecution of the DTO member.

These and other advantages of the present disclosure are provided in greater detail herein.

Illustrative Embodiments

FIG. 1 shows a map 2 with a border region 4 between the United States 6 and Mexico 8 highlighted, wherein the smaller divisions within each state represent counties. It will be appreciated that large numbers of vehicles cross in the border region 4 between the United States 6 and Mexico 8 every day, and that Drug Trafficking Organizations (DTOs) constantly seek to cause illegal drugs (e.g., cocaine, fentanyl, heroine) to cross the border. It is for this reason that the border region 4 may be a high-risk area for illegal drug trade, wherein vehicle owners may inadvertently be arrested as drug offenders when in fact they are blind mules, and DTO members may get away with placing (also referred to herein as planting) unknown cargo on vehicles and using them as blind mules to smuggle drugs between the United States 6 and Mexico 8. Additionally, while the disclosed concept is being described in association with the border region 4, it will be appreciated that other high-risk areas may necessitate use of the disclosed systems.

Figure 2A:
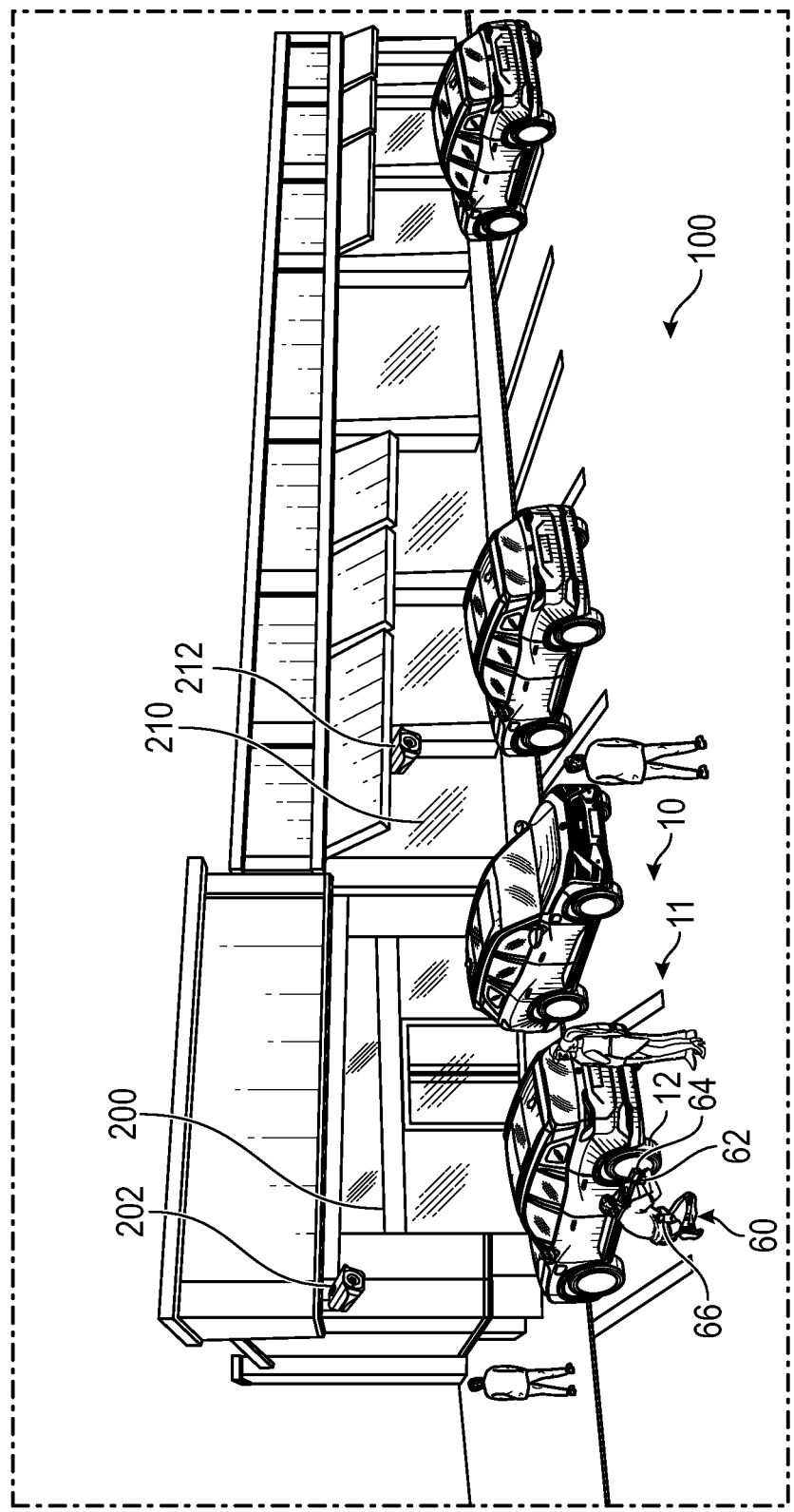
FIG. 2A is an isometric view of a vehicle and system therefor in a parking lot, with an individual attempting to put unknown cargo in a tire of the vehicle.
Figure 2B:
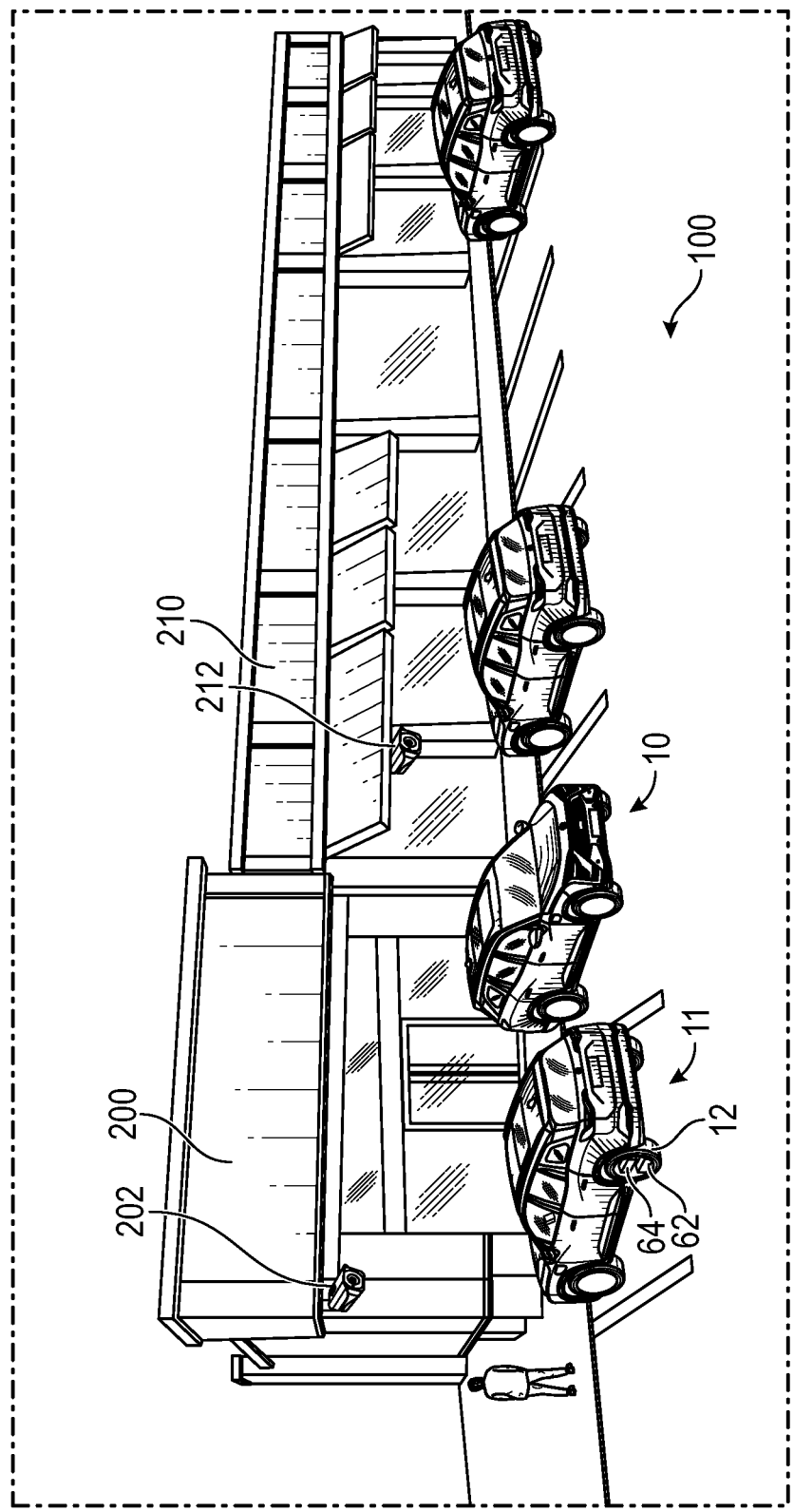
FIG. 2B is another isometric view of the vehicle and system therefor in the parking lot of FIG. 2A, and is shown with the unknown cargo in the tire of the vehicle.
Figure 3:
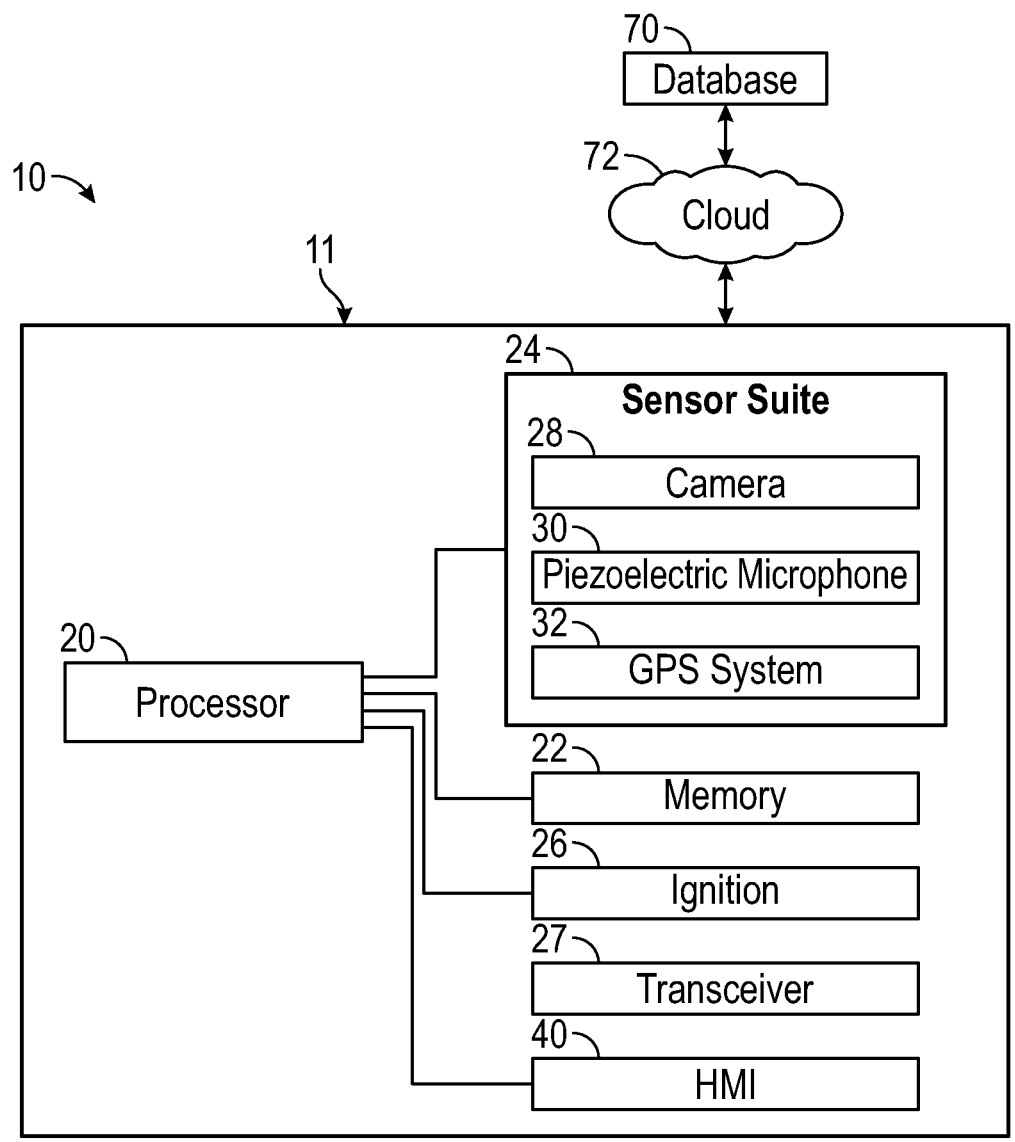
FIG. 3 is a simplified view of the vehicle and system therefor of FIGS. 2A and 2B, and is shown wirelessly connected to a database via a cloud.

FIGS. 2A and 2B show an isometric view of a vehicle 10 and system 11 therefor that are in a strip mall 100, and FIG. 3 shows a simplified view of the vehicle 10 and system 11 therefor. As shown in FIG. 3, the system 11, which may be an event detection system, has a processor 20, a memory 22, a sensor suite 24 electrically connected to the processor 20, an ignition 26 electrically connected to the processor 20, and a transceiver (e.g., Bluetooth Low-Energy (BLE), Ultra-Wideband (UWB), Wi-Fi, and/or Cellular transceiver 27). In one example, and as will be discussed below, the vehicle 10 and system 11 therefor are wirelessly connected to a database 70 via a cloud 72. The database 70 may store information corresponding to, for example and without limitation, a location of illegal drugs (if found), a vehicle year, model, and trim, a GPS location where it is believed illegal drugs were placed, a planned destination of the vehicle 10, and/or an origin of the vehicle 10 when last driven.

Furthermore, the memory 22 may have instructions that, when executed by the processor 20, cause the processor 20 to perform operations including receiving an ON command, and receiving data from the sensor suite 24. The data may be indicative of an event including the planting of unknown cargo on the vehicle 10. It may also be determined via analysis of the data the location or approximate location on the vehicle where the unknown cargo was planted, such as in a wheel well, under a bumper, in a rear hatch, etc. Additionally, it will be appreciated that the processor 20 may also determine that a key for the vehicle 10 is spaced a predetermined distance from the vehicle 10. In other words, the processor 20 may determine that the owner of the vehicle 10 is not near the vehicle 10 such that the vehicle 10 might be more vulnerable to tampering with than otherwise.

In one example, the ON command may be either user activated (e.g., without limitation, via a human to machine interface (HMI) 40 that is electrically connected to the processor 20, via a voice command, and/or via a signal from a mobile device) or automatically activated responsive to the vehicle 10 being in a defined geographical area (e.g., the border region 4 (FIG. 1)). The ON command may correspond to a heightened alert mode of the vehicle 10 that functions for security monitoring purposes, and for a predetermined amount of time until the vehicle 10 crosses a border of a country. The ON command may also and/or in addition be configured for a heightened security mode of the vehicle 10 for a predetermined number of miles driven and/or nights driven. Moreover, an alert may be sent to a mobile device (e.g., a mobile phone) of the driver of the vehicle 10 indicating to him or her that he or she is in a high-risk area (e.g., the border region 4 (FIG. 1)), thus prompting him or her to issue the ON command to the processor 20 of the vehicle 10. Such an alert may be sent to the driver if a GPS location of the vehicle 10 is known to have a past likelihood of bind drug mule victimization, and/or if the vehicle is in a quick-change oil location, and/or if the vehicle 10 was repaired or serviced at a facility near the border region 4.

Once the ON command has been received by the processor 20, the vehicle 10 may be "armed" to detect events, such as blind drug mule events. FIGS. 2A and 2B illustrate an example embodiment in which the disclosed concept may be employed. As shown in FIG. 2A, the vehicle 10 is in the strip mall 100, and the owner of the vehicle 10 is not in or near the vehicle 10. In the example of FIGS. 2A and 2B, the strip mall 100 is in the border region 4. Accordingly, after the processor 20 (FIG. 3) has received the ON command (e.g., automatically by virtue of the vehicle 10 being in the border region 4 or via the user activation through the HMI 40 or mobile device of the driver), the vehicle 10 may be configured to guard against unwanted activities.

For example, as shown in FIG. 2A, a DTO member 60 has a tracker device (e.g., BLE ID or UWB ID tracker device 62) and illegal drugs 64 in his hand and is attempting to place those items in a wheel 12 of the vehicle 10. As such, the DTO member 60 may be hoping that the vehicle 10 will be driven across the border region 4 between the United States 6 and Mexico 8, such that another member of his DTO will be able to find the vehicle 10 with the tracker device 62 and remove the illegal drugs 64, without being caught by authorities. However, in accordance with the disclosed concept, the vehicle 10 is guarded against such an event (e.g., a blind drug mule event).

More specifically, and in one example embodiment, the ignition 26 is configured to move between an OFF state and an ON state, and the processor 20 may be configured to receive data from the sensor suite 24 when the ignition 26 moves from the OFF state to the ON state. The sensor suite 24 may include a Macro Capacitive Sensor and a plurality of other sensors including, for example and without limitation, a camera 28, a piezoelectric microphone 30, and a GPS system 32. Accordingly, when the ignition 26 moves from the OFF state to the ON state (e.g., the owner returns to the vehicle 10 and turns the vehicle 10 on), the sensor suite 24 can determine whether there has been any one or all of a change in an odometer of the vehicle 10, a change in a fuel level of the vehicle 10, a change in a battery charge level of the vehicle 10, a change in a weight of the vehicle 10, a change in an angular position of one or more wheels 12 of the vehicle 10, a change in engine temperature, a change in engine coolant temperature, a change in an inclination of the vehicle, a usage of a new key with the vehicle 10, and a change in a door, trunk, hood, and/or frunk status. All of these determinations may be made by the sensor suite 24, and communicated to the processor 20, which may in turn determine if an individual change of any one of the aforementioned and/or unique combination of change of the aforementioned corresponds to a blind drug mule event. That is, the processor 20 is configured to determine whether any, all, or an intermediate number of changes of the aforementioned uniquely correspond to a blind drug mule signature, and communicate this information to a driver of the vehicle 10.

For example, the processor 20 may determine that the vehicle 10 is in an ON state, calculate a first weight of the vehicle 10 with the sensor suite 24, determine that the vehicle 10 is in an OFF state, calculate a second weight of the vehicle 10. Subsequently, if the first weight is different than the second weight (e.g., when the vehicle 10 moves back to the ON state), the processor 20 may then send an alert to the HMI 40 of the vehicle. In the instant example, the first and second weights are independent of a weight of occupants of the vehicle 10. That is, the processor 20 is configured to determine whether extra weight detected by the sensor suite 24 corresponds to a weight of an occupant of the vehicle, their cargo, and/or, and more importantly, unknown cargo like the tracker device 62 and the illegal drugs 64. Accordingly, any changes in the weight determined by the sensor suite 24 could be communicated (e.g., via alert signals to mobile devices, the HMI 40, and the like), thereby prompting the driver to take action.

Figure 4A:
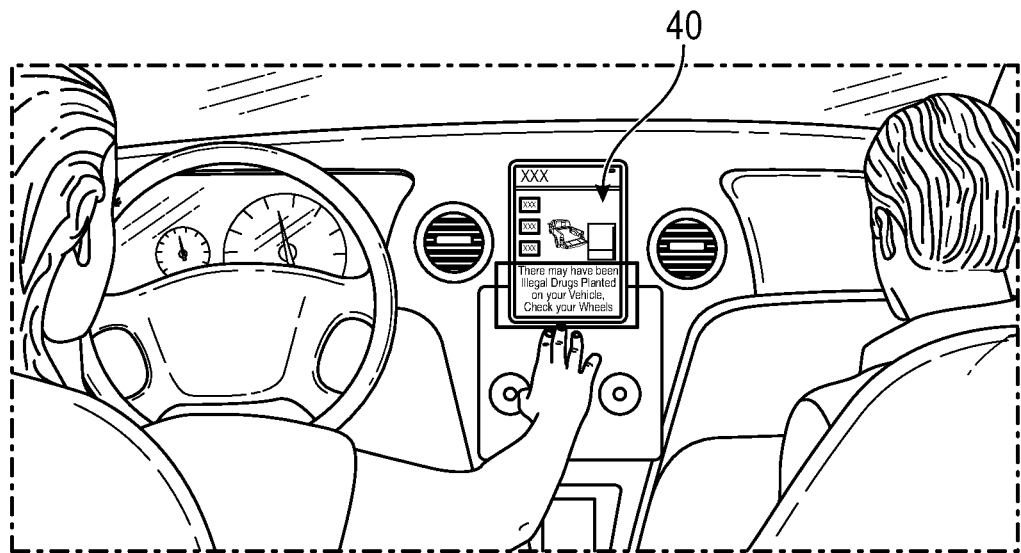
FIG. 4A shows an interior of the vehicle of FIG. 3, and is shown with two passengers inside the vehicle.
Figure 4B:
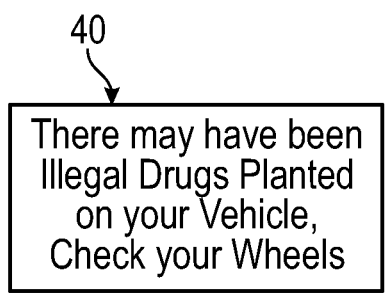
FIG. 4B is an enlarged view of a human to machine interface of the vehicle of FIG. 4A.

In addition to employing the sensor suite 24 to perform the above-mentioned passive checks of the vehicle 10, the sensor suite 24 is also configured to perform passive checks when the vehicle 10 is in motion (e.g., when the vehicle 10 has left the strip mall parking lot 100 and is driving). In one example, the processor 20 may be configured to cause the transceiver 27 to check for periodic RF transmissions that stay with the vehicle 10 when the vehicle is in motion. Accordingly, if the owner of the vehicle 10 drives the vehicle 10 away from the parking lot 100 (FIGS. 2A and 2B) and the tracker device 62 is still attached to the wheel 12, any periodic RF transmissions given off by the tracker device 62 will be detected by the transceiver 27, which can cause the processor 20 to send an alert to the HMI 40, thereby alerting the owner of the vehicle 10 of the situation. FIGS. 4A and 4B are illustrative. As shown, the HMI 40 is displaying an alert message to the owner of the vehicle which says, "There may have been Illegal Drugs Planted in Your Vehicle, Check your Wheels." When the owner sees the alert message, he or she can pull the vehicle 10 over, check the wheels 12, and potentially retrieve the tracker device 62 and the illegal drugs 64, thus minimizing the likelihood that he or she will drive across the border and be arrested.

In another example of how the sensor suite 24 may perform passive checks of the vehicle 10 while the vehicle 10 is in motion (e.g., in a DRIVE or REVERSE state), the processor 20 may employ the sensor suite 24 to determine there has been a change in mass times acceleration of the vehicle 10, to determine there has been a change in ride acoustics of the vehicle 10, and to determine there has been a change in ride dynamics of the vehicle 10. In other words, if unknown cargo, such as the tracker device 62 and the illegal drugs 64, has been attached to the vehicle 10, the vehicle 10 will inherently drive differently. The extra weight in one area of the vehicle, e.g., the wheel 12, will cause ride dynamics, acoustics, and mass times acceleration, to all be different, as compared to a state of the vehicle 10 before such unknown cargo was placed therein. Accordingly, the sensor suite 24 may be configured to gather all this data, both before a key off situation by the owner of the vehicle, at key on when the owner returns (e.g., and after any unknown cargo has been added to the vehicle 10), and as the vehicle 10 is being driven. The comparisons made by the processor 20 during all of these times are what will allow the processor 20 to determine whether any blind drug mule event has occurred. If the processor 20 determines that such an event has happened, the processor 20 can cause the aforementioned alert to be displayed by the HMI 40, can cause an audio alert to be played in the vehicle 10 by an infotainment system of the vehicle 10, can cause a wireless alert notification to be sent to any mobile device associated with the vehicle 10, and can cause a wireless alert to be sent to a law enforcement authority, and/or to a cloud.

In addition to passively monitoring the vehicle 10 for events such as blind drug mule events, the system 11 may be configured such that the processor 20 receives data from the sensor suite 24 when the vehicle 10 is in an OFF state (e.g., when the ignition 26 is in an OFF state), e.g., may actively monitor surroundings for blind drug mule events. This may occur if, for example, the vehicle 10 has adequate battery charge remaining and/or if a driver of the vehicle 10 only expects to be in the high-risk area (e.g., the border region 4, FIG. 1) for a relatively short duration of time.

For example, and referring again to FIG. 2A, as shown, the DTO member 60 has a mobile device 66. In accordance with the disclosed concept, and with the vehicle 10 in an OFF state, the sensor suite 24 is configured to actively monitor the space surrounding the vehicle 10 and detect the presence of a mobile device (e.g., the mobile device 66) that is not associated with (e.g., paired with) the vehicle 10. The processor 20 may be configured to determine that the mobile device 66 is positioned proximate the vehicle 10 in a manner consistent with a threat pattern (e.g., is near or under the vehicle 10 and is not paired or associated with the vehicle 10), and thereby send a signal to a mobile device of the owner, send an alert signal to the HMI 40 of the vehicle when the vehicle 10 is moved to the ON state, etc.

In another example of active monitoring (e.g., when the vehicle 10 is in the OFF state) of the vehicle 10 with the sensor suite 24, the sensor suite 24 is further configured to detect the presence of an individual (e.g., the DTO member 60) breaching a perimeter of the vehicle 10. This may comprise creating a MCS bumper around the entire vehicle 10 as a trigger method to detect anyone (e.g., the DTO member 60) breaching a perimeter of the vehicle 10.

In a further example, it will also be appreciated that when a driver of the vehicle 10 returns to the vehicle, the processor 20 of the vehicle 10 may be configured to send a wireless alert notification to a mobile device of the driver and/or to the HMI 40 and/or provide an audio alert, indicating that the driver should check certain areas of the vehicle 10. See, for example, the readout of the HMI 40 in FIG. 4B.

Figure 5:
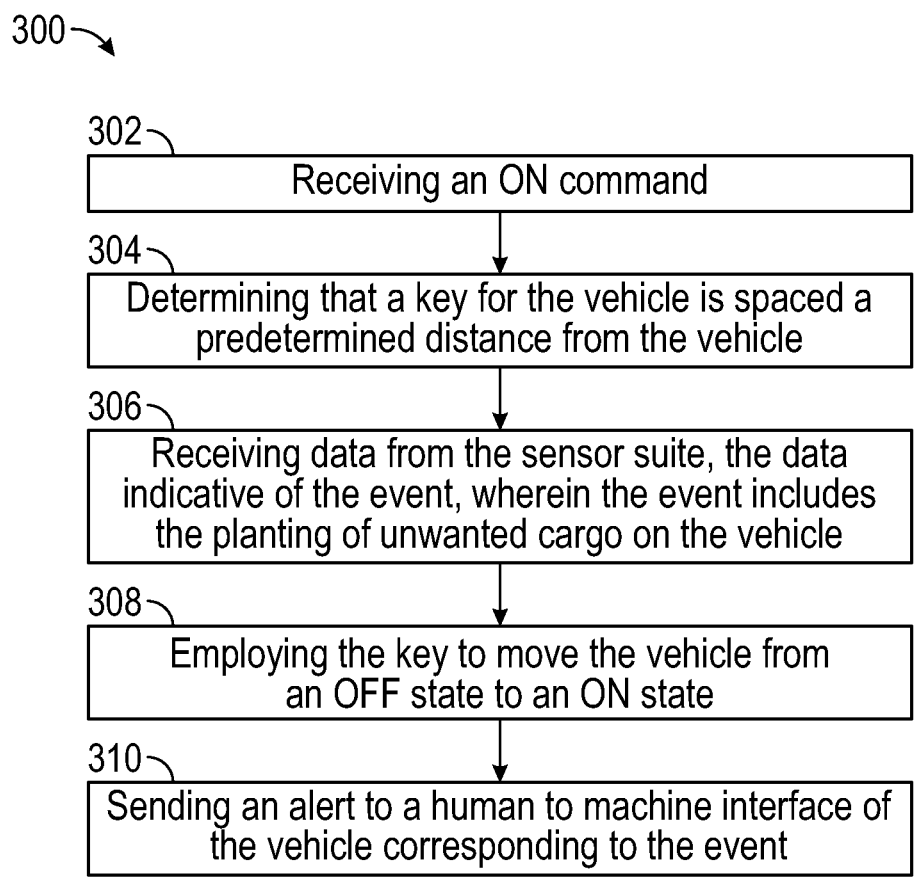
FIG. 5 is a flow diagram corresponding to an event detection method for the vehicle of FIG. 3.

FIG. 5 shows a flow diagram corresponding to an event detection method 300 in accordance with the disclosed concept. As shown, the method 300 may include a first step 302 of receiving an ON command, a second step 304 of determining that a key for the vehicle 10 is spaced a predetermined distance from the vehicle 10 (e.g., the owner is not near the vehicle), and a third step 306 of receiving data from a sensor suite 24. The data from the sensor suite 24 may be indicative of the event, and the event may include the planting of unknown cargo on the vehicle 10. Finally, the method 300 may include a fourth step 308 of employing the key of the vehicle 10 to move the vehicle 10 from an OFF state to an ON state, and a fifth step 310 of sending an alert to a HMI 40 of the vehicle corresponding to the event.

In order to further protect the driver of the vehicle 10 from blind mule victimization, the driver may elect to use inspection services provided by third parties when he or she has reason to believe that there has been tampering with the vehicle 10. This may include under-chassis camera screening services that are provided at a third party business (e.g., a car wash, a restaurant, a gas station, and/or an electric vehicle charging station located in the border region 4). Manual inspection services may also be called to inspect the vehicle 10. Remote control devices may also be used by an owner of the vehicle 10 to inspect the under-chassis. Furthermore, acoustic tap and knock tests may be performed by the owner of the vehicle 10 before leaving the vehicle 10 and after returning to the vehicle 10.

In another example embodiment of the disclosed concept, it is also contemplated that the system 11 may be an evidence collection system for the vehicle 10, one that may be activated twenty-four hours a day seven days a week when the vehicle 10 is in the border region 4. For example, the processor 20 of the system may be configured to receive the ON command, and then collect evidence with the sensor suite 24 responsive to receiving the ON command. In one example the evidence collection is performed with the vehicle 10 in an OFF state.

As stated above, the sensor suite 24 may include the camera 28, the piezoelectric microphone 30, and the GPS system 32, all of which may function together or independently to capture data corresponding to blind drug mule events. Furthermore, the memory 22 of the system 11 may further include instructions that, when executed by the processor 20, cause the processor 20 to store data from the sensor suite 24 in the cloud 72 in order to create an evidence database (e.g., database 70). More specifically, the camera 28 may be configured to capture images corresponding to objects being placed on the vehicle 10 and a driver of the vehicle 10. This data may then be stored in the database 70 via the cloud 72, and may advantageously be used at a later point to either assist with tracking down the DTO member 60 and/or exonerating the driver of the vehicle 10.

For example, when the vehicle 10 is parked in the position shown in FIG. 2A, and the DTO member 60 is attempting to illegally place drugs in the wheel 12, the camera 28 may actively capture footage of him, and the system 11 can store that footage in the database 70 via the cloud 72, thus making his apprehension more likely than otherwise. Similarly, the piezoelectric microphone 30 may be configured to actively (e.g., when the vehicle 10 is in an OFF state) monitor and record any vehicle tampering sounds, such as the sound of the tracker device 62 and the illegal drugs 64 being secured to the wheel 12. This data can similarly be stored in the database 70 via the cloud 72 and later used as evidence to exonerate the driver of the vehicle 10 and/or assist with the apprehension of the DTO member 60.

Additionally, the GPS system 32 may also be configured to actively monitor the surroundings of the vehicle 10 when the vehicle 10 is in an OFF state. Specifically, the GPS system 32 may be configured to record a GPS location of the vehicle 10, an orientation of the vehicle 10, and a GPS location of a business (e.g., businesses 200,210 shown in FIGS. 2A and 2B) disposed proximate the vehicle 10. This data from the GPS system 32 may, like data from the camera 28 and the piezoelectric microphone 30, be stored in the database 70 via the cloud 72, thereby aiding in exoneration of the driver of the vehicle 10 and/or arrest of the DTO member 60. For example, the GPS system 32 may, in the example of FIGS. 2A and 2B, capture a GPS location of the businesses 200,210, and store that information in the database 70. In turn, during any criminal investigation, that data may readily be used to determine that the businesses 200, 210 had corresponding surveillance cameras 202,212, such that footage from the surveillance cameras 202,212 might be used to show that it was the DTO member 60, and not the driver of the vehicle 10, who placed the tracker device 62 and the illegal drugs in the wheel 12. Thus, the evidence collection system 11 advantageously minimizes the likelihood that someone will be wrongfully prosecuted as a blind drug mule, and further increases the likelihood that a DTO member (e.g., DTO member 60) responsible for a blind drug mule event will be arrested and prosecuted.

In another example, the evidence collection system 11 may also be performed when the vehicle 10 is in an ON state. For example, if a driver of the vehicle 10 leaves the ignition 26 in an ON state and, for example, runs into the business 200 for a transaction, the camera 28, the piezoelectric microphone 30, and the GPS system 32 may all collect data in the same manner as prescribed above and transmit that data to the database 70, thereby increasing the likelihood that the driver will be exonerated and/or that the DTO member 60 will be apprehended and prosecuted.

In yet a further example, the sensor suite 24 may be configured to identify if an individual has been proximate to the vehicle 10 for a suspicious amount of time (e.g., a predetermined period as determined by an algorithm). For example, stored in the database 70 (FIG. 3) may be a list of drivers, people who have been in the vehicle 10, and people who have been around vehicle 10 for more than a predetermined amount of time, and within a predetermined amount of time leading up to a border crossing. Accordingly, the processor 20 may be configured to check if any of these people are affiliated with a DTO, check if the suspicious people are authorized to be around the vehicle 10, report such people to law enforcement, and/or request an inspection of the vehicle 10.

Furthermore, the system 11 may be configured to identify whether components of the vehicle 10 were altered. For example, interior cameras of the vehicle 10 may be used when doors are opened, and activity is detected. Additionally, occupant sensing radar may detect occupants to record which components of the vehicle 10 were altered, removed, etc. Exterior cameras may also be employed to detect if components were removed from the vehicle 10. Accordingly, the system 11 may be configured to isolate which interior and/or exterior components of the vehicle 10 were removed and communicate such information to the owner of the vehicle 10. Furthermore, if certain components that were altered were not associated with a desired repair, if performed, an alert may be sent to the driver of the vehicle 10. Any of the alerts of the processor 20 of the vehicle 10 may also and/or additionally be sent to any law enforcement authorities, as necessary.

It will also be appreciated that as the vehicle 10 is passing through a border checkpoint (e.g., through the border region 4), checkpoint-based underbody cameras/imaging equipment may record features of the vehicle 10. On the way back, the same scan may be performed such that if there are any suspicious compartmental differences, the vehicle 10 may be scanned and/or the driver of the vehicle 10 may be alerted. Additionally, if a tracker device (e.g., the tracker device 62) is detected, the vehicle 10 may attempt to jam the signal or even locate the tracker device 62 via signal triangulation in an effort to disable and/or neutralize the tracker device 62 by informing the driver of the location of the tracker device 62.

Moreover, as stated above, any suspicious activities (e.g., planting of unknown cargo and/or idling nearby of DTO members) may be analyzed, recorded, and/or transmitted by the processor 20 to the cloud 72 and to any mobile devices of the owner. This may include exterior sound exciters functioning as a microphone to analyze sounds and video. All of this video and audio information may be transmitted to anyone near the vehicle 10 and to the cloud 72 to be held as determined by GPS until the border is crossed and the person arrives home, and/or 24 hours after the border crossing.

As a result, sound exciters of the vehicle 10 may inform anyone within a predetermined distance of the vehicle 10 that they are being recorded and that audio/video is going to the cloud 72. Additionally, any exterior and/or interior displays located in, on, or nearby the vehicle 10 may show faces of people being recorded as soon as the predetermined distance limit is passed. This may deter people from tampering (e.g., they will know their face is already being captured). It will also be appreciated that the vehicle 10 may be equipped with "underneath" cameras, such that these cameras may take images with a time stamp before and after key OFF/ON. Artificial Intelligence and Machine Learning may also be employed for such verification, and the data can be used for any future criminal prosecutions and/or apprehension of bad actors.

Electronic noses or "e-nose" or "e-sniffers" may also be employed by establishments (e.g., the businesses 200,210) that may screen the vehicle 10 as a service. As costs reduce, such "e-sniffers" may be considered as OEM content on the vehicle 10.

In another example, unknown cargo may be attached with a magnet underneath the vehicle 10, or via a spare-tire replacement that may be hard to detect with existing vehicle hardware. The unknown cargo may be small (e.g., a few pounds), and as such may be hard to detect. Accordingly, the system 11 may be configured such that an external microphone (e.g., the piezoelectric microphone 30) in a low power piezo-sensing mode may be configured to detect placement of the unknown cargo on the vehicle 10. The microphone 30 may be able to detect vibration and require minimum power (e.g., since the microphone 30 may actually consume power as it vibrates). There may be four microphones to cover each side of the vehicle 10. Accordingly, the combined signal of the four microphones may be used to generate a "baseline" pattern, in order to account for vibration induced by other vehicles passing nearby. As the signal is detected, such as from the shock of someone placing a magnet on the underside, the system 11 may be activated. Other monitoring data may be requested from a nearby device, such as from a home surveillance system. In any event, a "shock" event may be registered, and the owner may be alerted.

It will be appreciated that the vehicle 10 may take the form of a passenger or commercial automobile such as, for example, a performance vehicle, a car, a truck, a crossover vehicle, a sport utility vehicle, a van, a minivan, a taxi, a bus, etc., and may be configured and/or programmed to include various types of automotive drive systems. Additionally, in one example embodiment, the vehicle 10 may be configured as an electric vehicle (EV). More particularly, the vehicle 10 may include a battery EV (BEV) drive system or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 10 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Accordingly, if the vehicle 10 is configured as an EV, and if one of the battery packs and/or the entire battery of the vehicle 10 is replaced, the system 11 may monitor the state of charge, electrical characteristics, mileage to drain, and the like in order to ensure that the vehicle 10 has the same power as before (e.g., a previous time step, when the vehicle 10 is turned off).

Further, the vehicle 10 may have an autonomous driving system that is configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system event.

Level-5 AVs may include fully autonomous vehicle systems that require no human input for operation, and may not include human operational driving controls.

Accordingly, if the vehicle 10 is an autonomous vehicle as described, and any of the aforementioned alert conditions are triggered, the vehicle 10 can immediately drive to a drug enforcement agency waiting area for an inspection, where the vehicle 10 will communicate the suspicious activity. As a counter point, if thieves are tracking the GPS of the vehicle 10 such that they know the vehicle 10 is driving to an inspection point, they will know they have been caught and accordingly write the unknown cargo as a loss. As such, another embodiment of the system 11 may include having the vehicle 10 notify the police to have them setup a "sting" operation.

The processor 20 of the vehicle 10 may be a commercially available general-purpose processor, such as a processor from the Intel® or ARM® architecture families. The memory 22 of the vehicle 10 may be a non-transitory computer-readable memory storing program code, and can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An event detection system for a vehicle, the system comprising:
a processor;
a sensor suite electrically connected to the processor; and
a memory comprising instructions that, when executed by the processor, cause the processor to perform operations comprising:
receiving an ON command, wherein the ON command is automatically activated responsive to the vehicle being in a defined geographical area, and wherein the ON command corresponds to a heightened alert mode of the vehicle for security monitoring up to a predetermined amount of time until the vehicle crosses a border of a country;
receiving data from the sensor suite, the data indicative of an event; and
determining the event includes a placing of unknown cargo on or within the vehicle.

2. The system according to claim 1, further comprising an ignition electrically connected to the processor and configured to move between an OFF state and an ON state, and wherein data from the sensor suite is received when the ignition moves from the OFF state to the ON state.

3. The system according to claim 2, wherein the event comprises at least one of a change in an odometer of the vehicle, a change in a fuel level of the vehicle, a change in a battery charge level of the vehicle, a change in a weight of the vehicle, a change in an angular position of one or more wheels of the vehicle, a change in engine temperature, a change in engine coolant temperature, a change in an inclination of the vehicle, a usage of a new key with the vehicle, and a change in a door status.

4. The system according to claim 1, wherein the memory further comprises instructions that, when executed by the processor, causes the processor to perform operations comprising determining, based on the data from the sensor suite, a location on the vehicle where the unknown cargo was placed.

5. The system according to claim 1, wherein the memory further comprises instructions that, when executed by the processor, causes the processor to perform operations comprising determining that the vehicle is in an ON state, calculate a first weight of the vehicle with the sensor suite, determine that the vehicle is in an OFF state, calculate a second weight of the vehicle, and send an alert to a human to machine interface of the vehicle if the first weight is different than the second weight when the vehicle is moved to the ON state, and wherein the first and second weights are independent of a weight of occupants of the vehicle.

6. The system according to claim 1, wherein data from the sensor suite is received while the vehicle is in motion.

7. The system according to claim 6, wherein the system further comprises a transceiver, and wherein the memory further comprises instructions that, when executed by the processor, cause the processor to perform operation comprising employing the transceiver to check for periodic RF transmission that stays with the vehicle.

8. The system according to claim 7, wherein the memory further comprises instructions that, when executed by the processor, cause the processor to perform operations comprising determining there has been a change in mass times acceleration of the vehicle, determine there has been a change in ride acoustics of the vehicle, and determine there has been a change in ride dynamics of the vehicle.

9. The system according to claim 1, wherein data from the sensor suite is received with the vehicle in an OFF state.

10. The system according to claim 1, wherein the data is indicative of a presence of a mobile device not associated with the vehicle.

11. The system according to claim 10, wherein receiving data from the sensor suite further comprises detecting the presence of an individual breaching a perimeter of the vehicle.

12. The system according to claim 11, wherein the sensor suite comprises a Macro Capacitive Sensor.

13. An event detection system for a vehicle, the system comprising:
a processor;
a sensor suite electrically connected to the processor; and
a memory comprising instructions that, when executed by the processor, cause the processor to perform operations comprising:
checking, using a transceiver, for periodic RF transmissions that stay with the vehicle;
receiving an ON command, wherein the ON command is either user activated or automatically activated responsive to the vehicle being in a defined geographical area;
receiving data from the sensor suite while the vehicle is in motion, the data indicative of an event; and
determining the event includes a placing of unknown cargo on or within the vehicle.

14. An event detection system for a vehicle, the system comprising:
a processor;
a sensor suite electrically connected to the processor, wherein the sensor suite comprises a Macro Capacitive Sensor; and
a memory comprising instructions that, when executed by the processor, cause the processor to perform operations comprising:
receiving an ON command;
receiving data from the sensor suite, the data indicative of a presence of a mobile device not associated with the vehicle;
detecting the presence of an individual breaching a perimeter of the vehicle; and
determining an event includes a placing of unknown cargo on or within the vehicle.

\* \* \* \* \*